(12) United States Patent
Leung

(10) Patent No.: US 7,600,730 B2
(45) Date of Patent: Oct. 13, 2009

(54) PORTABLE COMPUTER STAND

(76) Inventor: Chily C. Leung, 3563 Mesa Garden Cir., Magna, UT (US) 84044

( * ) Notice: Subject to any disclaimer, the term of this patent is extended or adjusted under 35 U.S.C. 154(b) by 0 days.

(21) Appl. No.: 11/947,404

(22) Filed: Nov. 29, 2007

(65) Prior Publication Data

US 2008/0142662 A1    Jun. 19, 2008

Related U.S. Application Data

(60) Provisional application No. 60/874,998, filed on Dec. 16, 2006.

(51) Int. Cl.
*A47B 91/00* (2006.01)
(52) U.S. Cl. .............. 248/346.3; 248/346.01; 248/676
(58) Field of Classification Search ............ 248/676, 248/370, 393, 165, 188.1, 346.01, 346.3, 248/917
See application file for complete search history.

(56) References Cited

U.S. PATENT DOCUMENTS

| | | | | |
|---|---|---|---|---|
| 3,885,762 | A | * | 5/1975 | Sebastiani ............... 248/460 |
| 4,691,891 | A | * | 9/1987 | Dionne ................... 248/551 |
| 4,813,644 | A | | 3/1989 | Goldner |
| D305,035 | S | * | 12/1989 | Yon et al. ................ D18/49 |
| 4,938,447 | A | * | 7/1990 | Schriner ................. 248/670 |
| 5,040,766 | A | * | 8/1991 | Egly et al. .............. 248/670 |
| 5,263,423 | A | | 11/1993 | Anderson |
| 5,470,041 | A | | 11/1995 | Cucinotta |
| 5,503,361 | A | | 4/1996 | Kan-O et al. |
| 5,511,758 | A | | 4/1996 | Hsu |
| 5,607,054 | A | | 3/1997 | Hollingsworth |
| 5,639,004 | A | | 6/1997 | Carlton et al. |
| 5,673,628 | A | | 10/1997 | Boos |
| 5,692,815 | A | * | 12/1997 | Murphy .................. 312/283 |
| 5,697,686 | A | | 12/1997 | Miller et al. |
| 5,732,910 | A | | 3/1998 | Martin |
| 5,871,094 | A | | 2/1999 | Leibowitz |
| 6,044,758 | A | | 4/2000 | Drake |
| 6,053,589 | A | | 4/2000 | Lin |
| 6,076,787 | A | | 6/2000 | Troyer |
| 6,079,338 | A | | 6/2000 | Yeh |
| 6,113,050 | A | | 9/2000 | Rush |
| 6,315,252 | B1 | | 11/2001 | Schultz |
| 6,352,233 | B1 | | 3/2002 | Barberich |
| 6,439,133 | B1 | | 8/2002 | Jaramillo |
| 6,474,614 | B2 | | 11/2002 | MacEachern |
| 6,505,797 | B1 | | 1/2003 | Dempsey |
| 6,527,241 | B1 | | 3/2003 | Lord |
| D475,057 | S | | 5/2003 | Lord |
| 6,608,749 | B2 | | 8/2003 | Hubbard |
| 6,637,350 | B2 | | 10/2003 | McKsymick |
| D483,767 | S | | 12/2003 | Green et al. |
| 6,682,040 | B1 | | 1/2004 | MacEachern |
| 6,748,873 | B2 | | 6/2004 | Brown, Sr. |
| 6,819,548 | B2 | | 11/2004 | Hillis et al. |
| 6,950,302 | B2 | | 9/2005 | Hubbard |

(Continued)

*Primary Examiner*—Gwendolyn Baxter

(57) ABSTRACT

Portable and collapsible laptop computer stands are described in this application. The computer stand may include at least two body members connected by at least one connecting member. The connecting member may be collapsible to allow the computer stand to adjust between a collapsed configuration and an extended configuration. The computer stand may also include slip-resistant portions on the top and bottom surfaces of the body members to maintain a stable platform for supporting at least a portion of a back edge of a laptop computer.

17 Claims, 3 Drawing Sheets

U.S. PATENT DOCUMENTS

| | | |
|---|---|---|
| D510,357 S | 10/2005 | Lye |
| 7,035,100 B2 | 4/2006 | Lord |
| 7,038,906 B2 | 5/2006 | Hubbard |
| 7,066,438 B2 * | 6/2006 | Ma .......................... 248/448 |
| 7,121,214 B1 | 10/2006 | Toltzman et al. |
| 2002/0063072 A1 | 5/2002 | Pham |
| 2002/0100398 A1 | 8/2002 | Santini |
| 2005/0077448 A1 | 4/2005 | Rossini |
| 2005/0099102 A1 | 5/2005 | Villarreal |
| 2005/0150432 A1 | 7/2005 | Wen |
| 2005/0150433 A1 | 7/2005 | Lo |
| 2005/0188899 A1 | 9/2005 | Yovich |
| 2005/0236447 A1 | 10/2005 | Monivis |
| 2005/0274852 A1 | 12/2005 | Saez et al. |
| 2006/0011790 A1 | 1/2006 | Lenz |
| 2006/0144884 A1 | 7/2006 | Abbate |
| 2006/0180058 A1 | 8/2006 | Monson |
| 2006/0214478 A1 | 9/2006 | Tsumura |
| 2007/0028812 A1 | 2/2007 | Dumond |
| 2007/0039982 A1 | 2/2007 | Carthern |
| 2007/0131825 A1 | 6/2007 | Skrodski |

* cited by examiner

PORTABLE COMPUTER STAND

PRIORITY

This application claims priority to U.S. Provisional Patent Application No. 60/874,998, filed Dec. 16, 2006, which is incorporated herein by reference in its entirety.

FIELD

This application relates generally to personal computer accessories. In particular, this application relates to a collapsible stand for portable computers. More particularly, this application relates to a portable computer stand that tilts the keyboard of the portable computer to an ergonomic and comfortable position, while further allowing increased airflow and cooling performance for the laptop computer.

BACKGROUND

Laptop, notebook, or otherwise portable personal computers, referred hereafter as laptops or laptop computers, have become a common business, education, and entertainment tool. Laptops come in a variety of sizes and configurations for a variety of uses and functions as varied as the people using them. For example, some laptop computers are very small with a minimized screen size and keyboard, and a very thin design to maximize portability, while other laptop computers have large screens, full-sized keyboards, optical disk drives, and many ports for connecting with different peripheral devices, allowing for a desktop-style environment in a portable configuration.

Laptop computers are overwhelmingly configured in a folding design, with a video screen and upper case resting or directing above a keyboard and lower case when closed, and a flat keyboard with the video screen raised to about 90 degrees from the keyboard creating a work space. Because of the necessity of portability and folding in laptops, the battery, CPU, harddrive, optical drive, and other peripheral components are usually located in the lower case, which is generally flat, and the video screen is usually located alone in the upper case. The flat lower case and upper case design allow for the ubiquitous book-type shape and configuration of laptops.

One problem with the laptop configuration is that the keyboard is then oriented parallel to whichever surface the laptop is placed on. This results in an uncomfortable and potentially injurious typing position for the user. Another problem with laptops is in keeping laptops cool. As laptops become more powerful and slimmer, cooling is a major design challenge for laptops, with a usual configuration including an air intake on the bottom of the lower case and an air exhaust for removing heat from the laptop on a side of the laptop case. When the laptop rests on different surfaces, the airflow may be less than optimal for cooling, sometimes resulting in laptop failure or user discomfort due to the heat generated by the laptop.

SUMMARY

Portable and collapsible laptop computer stands are described in this application. The computer stand may include at least two body members connected by at least one connecting member. The connecting member may be collapsible to allow the computer stand to adjust between a collapsed configuration and an extended configuration. The computer stand may also include slip-resistant portions on the top and bottom surfaces of the body members to maintain a stable platform for supporting at least a portion of a back edge of a laptop computer.

BRIEF DESCRIPTION OF THE DRAWINGS

The following description can be better understood in light of Figures, in which.

Figure 1:
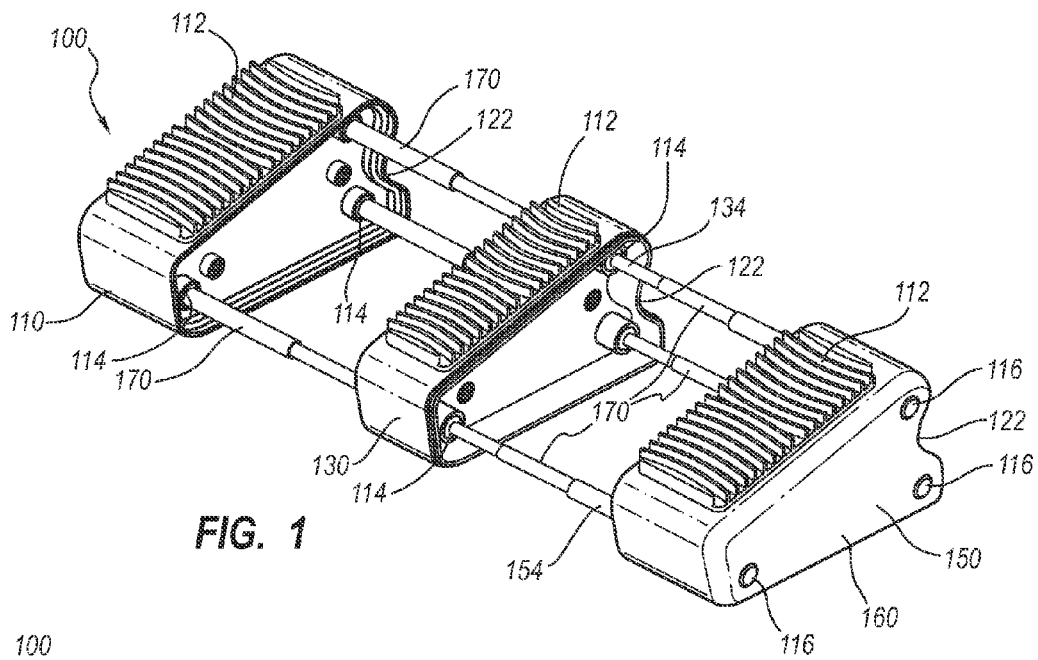
FIG. 1 illustrates a perspective view of an exemplary embodiment of a portable computer stand.

Together with the following description, the Figures demonstrate and explain the principles of the apparatus and methods described herein. In the Figures, the thickness and configuration of components may be exaggerated for clarity. The same reference numerals in different Figures represent the same component.

DETAILED DESCRIPTION

The following description supplies specific details in order to provide a thorough understanding. Nevertheless, the skilled artisan would understand that the apparatus and associated methods of using the apparatus can be implemented and used without employing these specific details. Indeed, the apparatus and associated methods can be placed into practice by modifying the illustrated apparatus and associated methods and can be used in conjunction with any apparatus and techniques conventionally used in the industry. For example, while the description below focuses on stand for a laptop computer, the apparatus and associated methods can be equally applied in any number of applications including those with other computer and electronic devices. Indeed, the apparatus and associated methods may be used with a variety of devices such as portable DVD players, personal video and audio devices (such as an iPod®), keyboards for desktop computers, musical devices, or any other device that a user desires to support for comfort, aesthetics, ergonomics, convenience, or any other reason.

Figure 5:
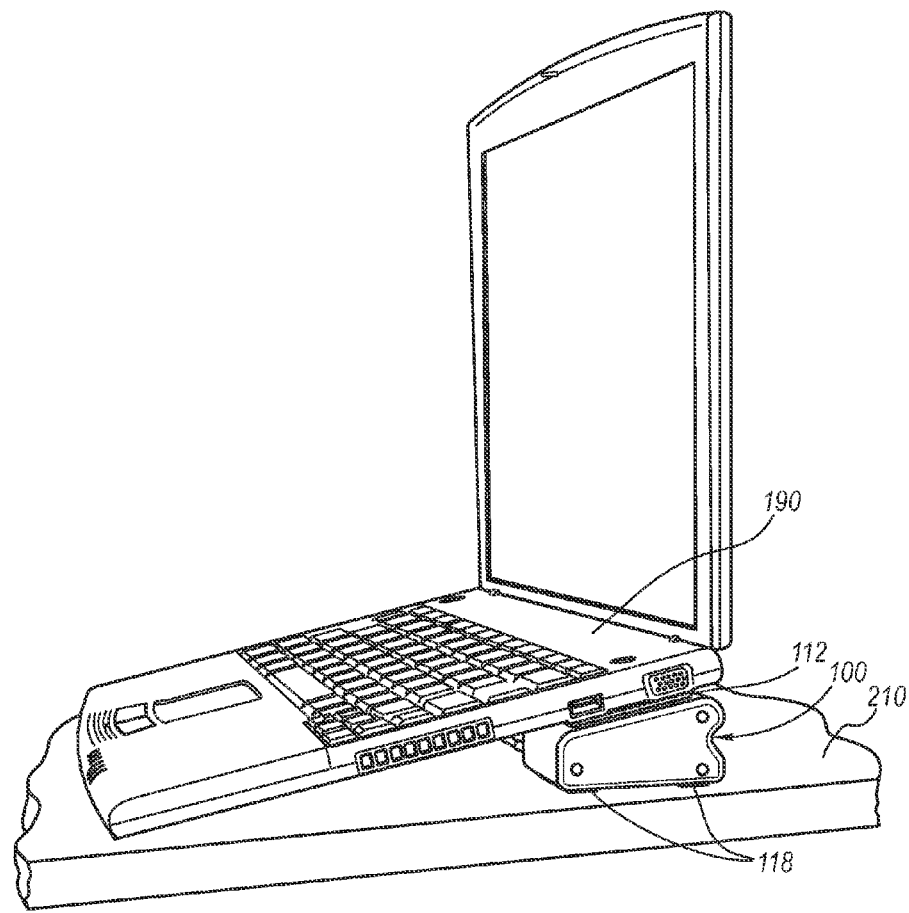
FIG. 5 illustrates the portable computer stand of FIG. 1 in use in an exemplary manner.

The portable computer stand can have any configuration consistent with its operation described in herein. One exemplary configuration of a portable computer stand is illustrated in FIGS. 1-5. Portable computer stand ("stand") 100 may be collapsible and include at least two body sections. FIG. 1 illustrates stand 100 with left section 110, middle section 130, right section 150 coupled together by connecting members 170. In some embodiments, stand 100 may include two body sections. In other embodiments, stand 100 may include four or more body sections. FIG. 5 illustrates stand 100 in use in one embodiment.

FIG. 1 illustrates stand 100 in an extended configuration. As, shown in FIG. 4, connecting members 170 may be telescoping members, similar in construction to telescoping pointers or radio antennae common on portable radios. Each of ends 172 174 of connecting members 170 may be connected to one of the body sections at connection points 114 116. In the Figures, three connecting members 170 are employed to connect body section 110 to body section 130 and three connecting members 170 are employed to connect body section 130 to 150. In some embodiments, only one connecting member 170 may be used to connect each of the body sections to another body section. Similarly, two, four, five or more connecting members 170 may also be used in some embodiments.

Figure 2A:
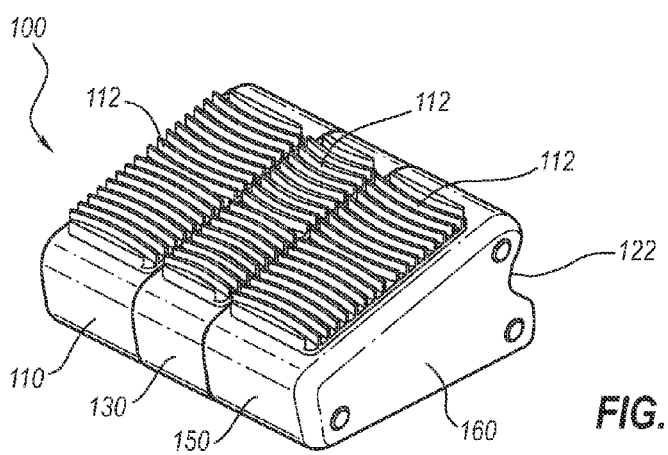
FIG. 2A illustrates a perspective view of the portable computer stand of FIG. 1 in a collapsed configuration.
Figure 2B:
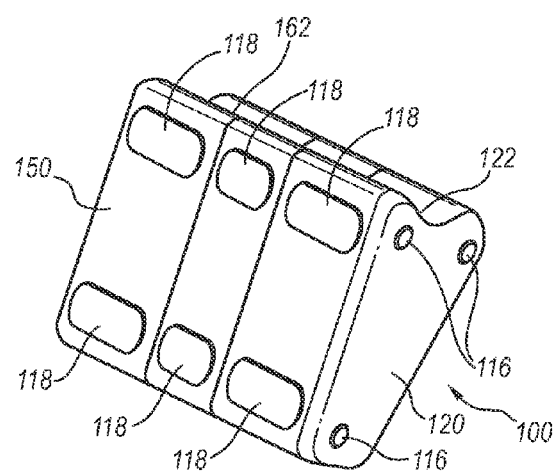
FIG. 2B Illustrates a bottom perspective view of the portable computer stand of FIG. 2.

FIGS. 2A and 2B illustrate stand 100 in a compact configuration. Connecting members 170 may be collapsed such that body sections 110 130 150 contact each other, forming a compact physical package. In the compact configuration, stand 100 may be used with a small device or may be in a convenient configuration for storage and transportation. In some embodiments, stand 100 may be partially extended to accommodate devices with varying sizes and configurations. For example, some laptop computers are larger and smaller than each other, and have cooling intakes in varying locations on the case. A user may adjust stand 100 to support at least a portion of a back edge of laptop computer 190 as shown in FIG. 5, moving each of body sections 110 130 150 to a location along the back edge of laptop computer 190 that best supports laptop computer 190 without obstructing cooling openings.

Figure 6:
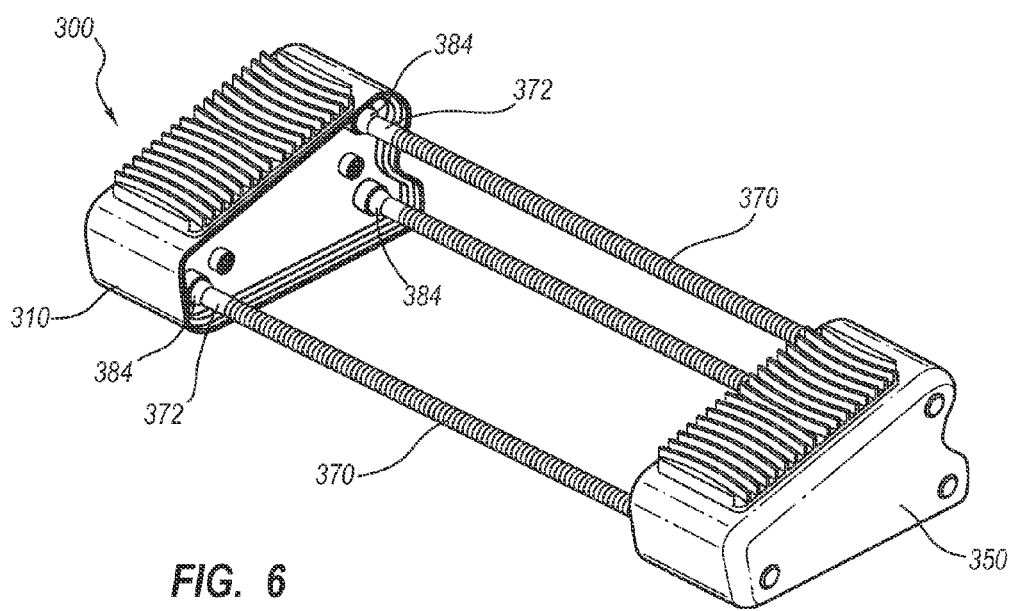
FIG. 6 illustrates a perspective view of an exemplary embodiment of a portable computer stand.

In some embodiments, connecting members 170 may allow stand 100 to be collapsible in ways other than by using telescoping connecting members 170. For example, FIG. 6 illustrates stand 300 with connecting members 370. Connecting members 370 may have surface features that interact with portions of connection points 384 of body sections 310 350, allowing body sections 310, 350 to slide along connecting members 370 relative to each other. In other embodiments, connecting members 170 or 370 may be collapsible in an accordion-type configuration, may be solid members with hinges and slides on body sections allowing stand 100 to move between a compact configuration and an extended configuration, may be draw strings, or any other means to allow relative movement and adjustment of body sections 110 130 150.

Each of sections 110, 130, 150 may include top slip resistant members 112 and bottom slip resistant members 118. Top slip resistant members 112 may resist motion of an apparatus, such as notebook computer 190 resting on stand 100 as shown in FIG. 5, creating a high friction surface interface between notebook computer 190 and stand 100. As shown in the Figures, top slip resistant members 112 may include surface features that enhance the slip resistant nature of top slip resistant members 112 Similarly, bottom slip resistant members 118 may resist motion of stand 100 on a surface on which it rests, such as surface 210 in FIG. 5. Slip resistant members 112 118 may be made of silicone, rubber, plastic, or any other material that allows for high friction interfaces as discussed.

Figure 3:
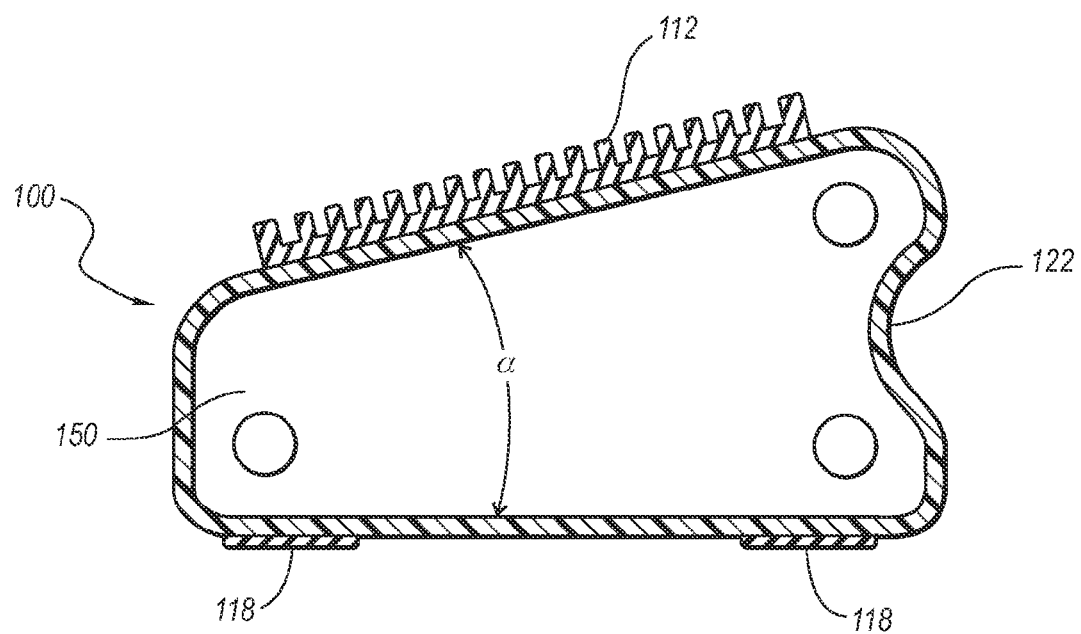
FIG. 3 illustrates a side view of the portable computer stand of FIG. 1.
Figure 4:
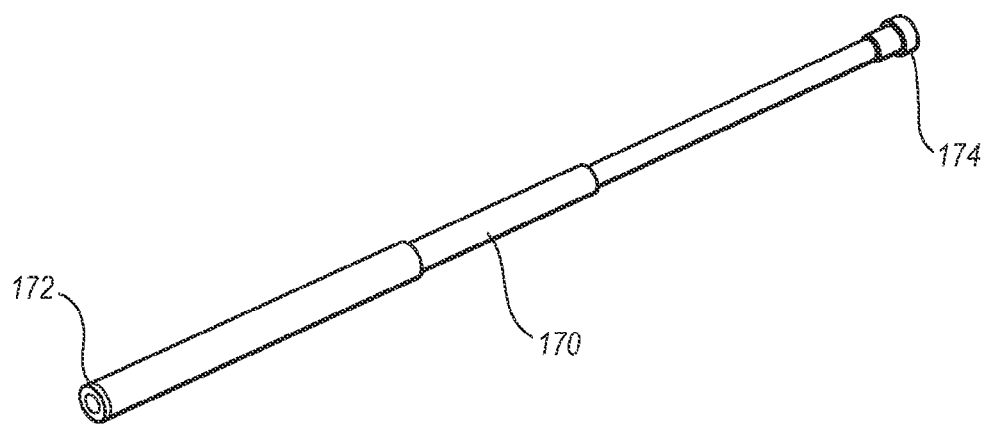
FIG. 4 illustrates an exemplary embodiment of a telescoping member.

FIG. 3 illustrates a side view of stand 100, particularly showing right body section 150, although the features described may be found in body sections 110 and 130. Angle α represents the angle between the bottom surface and top surface of stand 100. Angle α may be between about 5 and 30 degrees, particularly between about 13 and 15 degrees, depending on the desired use and configuration. Of course, in some embodiments, angle α may be any angle between 0 and 90 degrees as desired. Angle α may allow a maximum contact between top slip resistant members 112 and laptop computer 190, as illustrated in FIG. 5. In some embodiments, angle α may be adjustable, such that the top surface may be moved with respect to the bottom surface to change angle α. In such embodiments, back surface 122 may include adjusting members to allow change to angle α.

Similarly, in some embodiments, side surface 160 may include access points for connection points 116. Back surface 122 may include a feature for channeling cables such as power cables, printer cables, internet or connectivity cables, etc., along the back of stand 100, or to facilitate a user in gripping and using, including expanding and retracting, stand 100.

Each of the components of stand 100 may be made of metal, plastic, composite materials, or any other material that allows the functionality of stand 100 as discussed or as desired by one of ordinary skill. In some embodiments, stand 100 may include electronic components built into, or usable with, one or more components of stand 100, such as a USB replicator, cooling fan or fans, flash memory, speakers, or any other computer peripheral devices.

Stand 100 offers several advantages. One advantage is that the keyboard of a laptop computer may be placed at an angle for the comfort of the user and for improved ergonomics for the user, which may minimize discomfort and repetitive use injuries common with uncomfortable devices. Another advantage is that by elevating the bottom of laptop computer 190, increased airflow may be allowed for cooling laptop computer 190, as keeping portable electronic computing devices cool is important. Another advantage is that the compact design and collapsibility allows for easy transportation and use during travel, for example, on an airplane, at a table, or in a hotel room, furthering the usefulness and comfort of portable computers and other devices.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, examples are meant to be illustrative only and should not be construed to be limiting in any manner.

The invention claimed is:

1. A portable computer support device adapted to support a laptop computer, the portable computer support device comprising:
   a first support member including a top, front, back and side surfaces with a base member being parallel with a supporting surface; the front surface and back surface being attached to the base member and the top surface being attached to both the front and back surfaces; wherein, the back surface is higher than the front surface forming an inclined wedge shape from the front surface to the back surface;
   a second support member including a top, front, back and side surfaces with a base member being parallel with a supporting surface; the front surface and back surface being attached to the base member and the top surface being attached to both the front and back surfaces; wherein, the back surface is higher than the front surface forming an inclined wedge shape from the front surface to the back surface;
   a third support member including a top, front, back and side surfaces with a base member being parallel with a supporting surface; the front surface and back surface being attached to the base member and the top surface being attached to both the front and back surfaces; wherein, the back member is higher than the front surface forming an inclined wedge shape from the front surface to the back surface;

at least one connecting member configured to couple the first support member to the second support member; and at least one connecting member to couple the second support member to the third support member; wherein the at least one connecting members are adapted to collapsed such that the side surfaces of the first and second support members and second and third support members contact each other forming a compact physical package; and a plurality of slip resistant members located at least on the first support member, on the second support member, and on the third support member, the slip resistant members being configured to restrain the portable computer support device between the portable computer and the surface.

2. The device of claim 1, wherein the at least one connecting member is configured such that a distance between the first support member and the second support member is variable; and the distance between the second and third member is variable; when the connecting member is extended, the connecting member causes the first and second support members, or the second and the third support member, to be apart one from the other, with the extended distance being variable as to the length to which the connecting member is capable of being extended; when such connecting member is fully contracted or collapsed, it allows the first and second support members or the second and the third support members to be docked together coming into direct contact one with another, side by side, forming one support member.

3. The device of claim 2, wherein the at least one connecting member is a telescoping member, with two or more jointed and collapsible segments allowing the connecting member to be extended or collapsed into various lengths as desired.

4. The device of claim 2, wherein the at least one connecting member is one of a collapsible or retractable member, with two or more jointed and collapsible segments allowing the connecting member to be extended or collapsed into various lengths as desired.

5. The device of claim 1, wherein the first support member and the second support member are substantially similar in shape, and the second and third support member are substantially similar in shape, each having a top surface and a bottom surface, the top surface being oriented at an angle from the bottom surface, such that the first support member, the second support member, and the third support member all have a wedge shape.

6. The device of claim 5, wherein the angle is between about 17 and 30 degrees.

7. The device of claim 5, wherein the first support member, the second support member, and the third support member all have a back surface; wherein the back surface being concave for easy finger gripping and handling to extend or collapse the device.

8. The device of claim 5, wherein the plurality of slip resistant members are located at least on each of the top surface and the bottom surface of each of the first support member, the second support member, and the third support member.

9. The device of claim 1, wherein the first support member, the second support member, and the third support member are configured to contact the portable laptop computer along only at least a portion of one edge; wherein the device's orientation is adapted to be parallel to the back and the front of the portable laptop computer; such that the device is adapted to be between the back edge of the laptop computer and the surface the laptop computer is resting, the device is adapted to raise the back edge of the laptop computer and tilts the keyboard at an angle.

10. The device of claim 1, wherein the at least one connecting member is a plurality of connecting members, and wherein the first support member is coupled to the second support member by at least one of the plurality of connecting members, and wherein at least one of the plurality of slip resistant members is located on the first and the second support members.

11. The device of claim 1, wherein the plurality of connecting members are configured such that a distance between the first support member and the second support member is variable, and that each of the connecting members can be fully contracted or collapsed resulting in the first, and second member docking next to each other forming one support member.

12. A portable computer support device adapted to support a laptop computer, comprising:

a first support member having a maximum length less than about 5 inches;

a second support member having a maximum length less than about 5 inches;

a third support member having a maximum length less than about 5 inches; and at least one connecting member configured to couple the first support member to the second support member, at least one connecting member configured to couple the second support member to the third support member, wherein the at least one connecting member is configured to vary the distance between the first support member and the second support member; wherein the at least one connecting member is configured to vary the distance between the second support member and the third support member; wherein the at least one connecting members are adapted to collapsed such that side surfaces of the first and second support members and side surfaces of the second and third support members contact each other forming a compact physical package.

13. The device of claim 12, wherein the first support member and the second support member, and the third support member are substantially similar in shape, each having a top surface and a bottom surface, the top surface being oriented at an angle from the bottom surface, such that the first support member and the second support member and the third support member have a wedge shape.

14. The device of claim 12, further comprising a plurality of slip resistant members located at least on the first support member and the second support member, the slip resistant members being configured to contact the portable computer along at least one edge and to restrain the portable computer from moving with respect to a surface on which the portable computer and the device rest.

15. The device of claim 14, wherein the plurality of slip resistant members are located on each of the top surface and the bottom surface of each of the first support member and the second support member.

16. The device of claim 12, wherein the at least one connecting member is telescoping.

17. The device of claim 16, wherein the at least one connecting member is one of collapsible or retractable.

* * * * *